Figure 1:
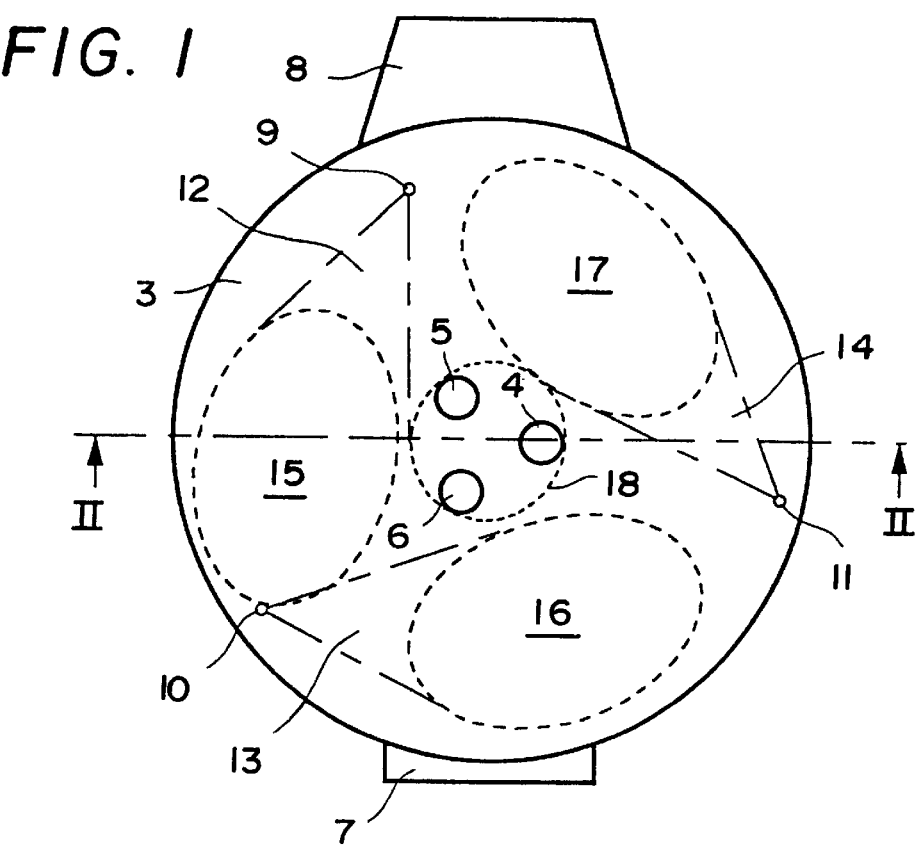

United States Patent
Bernet et al.

[11] Patent Number: 5,851,263
[45] Date of Patent: Dec. 22, 1998

[54] PROCESS FOR SMELTING STEEL IN AN ELECTRIC ARC FURNACE, AND ELECTRIC ARC FURNACE FOR ITS IMPLEMENTATION

[75] Inventors: Thierry Bernet, Nouméa; Philippe Destannes; Jean-Luc Roth, both of Metz, all of France

[73] Assignee: Usinor Sacilor, Puteaux, France

[21] Appl. No.: 732,327
[22] PCT Filed: Mar. 8, 1996
[86] PCT No.: PCT/FR96/00365
   § 371 Date: Jan. 23, 1997
   § 102(e) Date: Jan. 23, 1997
[87] PCT Pub. No.: WO96/28573
   PCT Pub. Date: Sep. 19, 1996

[30] Foreign Application Priority Data

Mar. 14, 1995 [FR] France .................... 95 02918

[51] Int. Cl.⁶ .................. C21C 5/52; F27B 3/22
[52] U.S. Cl. ................ 75/10.41; 75/10.42; 373/73
[58] Field of Search ............... 75/10.41, 10.42, 75/10.38, 10.6, 10.61, 10.63, 10.66, 10.39; 373/73, 74

[56] References Cited

U.S. PATENT DOCUMENTS

| | | |
|---|---|---|
| 4,730,336 | 3/1988 | Herneisen et al. . |
| 4,986,847 | 1/1991 | Knapp et al. .......................... 75/10.41 |
| 5,112,387 | 5/1992 | Lazcano-Navarro ................... 75/10.42 |
| 5,375,139 | 12/1994 | Bender ....................................... 373/85 |
| 5,531,805 | 7/1996 | Worner ................................... 75/10.63 |

FOREIGN PATENT DOCUMENTS

| | | |
|---|---|---|
| 589663 | 12/1959 | Canada ..................................... 373/73 |
| 0257450 | 2/1988 | European Pat. Off. . |
| 0630977 | 12/1994 | European Pat. Off. . |
| 7026318 | 1/1995 | Japan . |

*Primary Examiner*—Melvyn Andrews
*Attorney, Agent, or Firm*—Sixbey Friedman Leedom & Ferguson; Thomas W. Cole

[57] ABSTRACT

A process for smelting steel is implemented in an electric arc furnace of the type including a vessel containing a bath of molten steel, a roof resting on top of the said vessel and a single roof electrode or a plurality of roof electrodes lying within a circle. In the process an oxygenic gas in the form of gas jets is blasted into the vessel toward the surface of the bath, so that the areas of impact of the jets on the surface do not cover the electrode or the circle. The jets are blasted in from the upper part of the furnace and have a shallow depth of penetration into the bath. The invention also includes a steelmaking electric arc furnace including a vessel intended to contain the molten steel, a roof resting on top of the vessel, a single roof electrode or a plurality of roof electrodes lying within a circle, and tuyeres arranged in the roof for blasting broad and shallow jets of an oxygenic gas into the vessel toward as much of the surface of the steel as possible, the areas of impact of the jets on the surface not covering the electrode or the circle.

9 Claims, 1 Drawing Sheet

PROCESS FOR SMELTING STEEL IN AN ELECTRIC ARC FURNACE, AND ELECTRIC ARC FURNACE FOR ITS IMPLEMENTATION

The invention relates to the smelting of steel in electric arc furnaces. More specifically, it relates to the method of injecting gaseous oxygen into the chamber of the furnace, the function of this oxygen being to accelerate the melting of the scrap and to achieve complete combustion of the carbonaceous off-gases from the bath of liquid metal.

Steelmaking electric arc furnaces serve to melt the iron-containing raw materials (scrap, cast iron or prereduced iron ore) which are intended to form the bath of liquid steel, as well as to carry out at least the first steps in adjusting the composition of this liquid steel prior to casting it. In the case of furnaces supplied with alternating current, the supply of energy necessary to melt the metal charge and to adjust its temperature is mainly provided by an electric arc established between the bath and three graphite electrodes which pass through the roof resting on top of the vessel of the furnace and which are arranged above the bath. In the case of furnaces supplied with direct current, the current flows between at least one graphite roof electrode and at least one electrode which is fitted in the hearth of the furnace and brought into contact with the bath.

Currently, there is an increasing tendency to substitute some of this supply of electrical energy, or to add to it, a supply of fossil energy based on the combustion by gaseous oxygen of the carbon initially contained in the solid charge, or even also of carbonaceous materials deliberately added to the solid charge and/or to the liquid bath. It is also known to heat the scrap by means of oxygen, fuel-oil or natural gas burners. Overall, this supply of fossil energy may form 25 to 50% of the total potential energy introduced during the melting and smelting of the charge.

The successive reactions for complete combustion of carbon, by virtue of which reactions the supply of energy by means of oxygen is produced, may be written as:

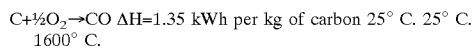
$C + \frac{1}{2}O_2 \rightarrow CO$ $\Delta H = 1.35$ kWh per kg of carbon 25° C. 25° C. 1600° C.

and

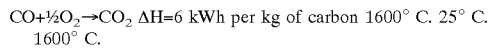
$CO + \frac{1}{2}O_2 \rightarrow CO_2$ $\Delta H = 6$ kWh per kg of carbon 1600° C. 25° C. 1600° C.

It is clearly the reaction of oxidation of CO to $CO_2$, usually designated by the expression "postcombustion of CO", which represents the most useful energy supply for the metal charge. However, in practice there is quite often only a small part of the available carbon which is completely burnt into $CO_2$ in the immediate vicinity of the solid or liquid metal. Decarburization of the liquid steel, whether this occurs naturally or as a result of blasting oxygen into the metal bath, forms CO which on escaping from the bath is not under conditions sufficiently favourable for its complete oxidation to $CO_2$. In fact, this oxidation occurs significantly only in the upper part of the furnace, when the CO comes into contact with the air which penetrates the furnace in an uncontrolled manner via the openings in the furnace and via the interstices separating the roof from the upper edge of the vessel on which it sits. The preferred region for postcombustion of CO is therefore too far from the metal charge and the combustion temperature is too low for this postcombustion to contribute very significantly to the heating of the scrap being melted or of the bath of liquid metal.

It has been conceived (see the document EP 0,257,450) to fit oxygen lances in the side wall of the furnace (above the level of the liquid bath) so as to accentuate the phenomenon of postcombustion of CO to $CO_2$. These lances are inclined at an angle of 30° to 60° with respect to the vertical and direct their jets tangentially to an imaginary cylinder defined either by the electrode itself, in the case in which the furnace is a single-electrode furnace, or by the cylinder in which the electrodes lie, in the case of a three-electrode furnace. These lances are aimed at those regions of the furnace which are usually the relatively coolest and where the melting of the scrap is slowest. However, experience has shown that the effectiveness of such equipment is not yet optimal.

The aim of the invention is to provide an effective method for carrying out as complete a postcombustion as possible of the CO produced in the furnace to $CO_2$, and to do this in such a way that the heat produced by this postcombustion is put to the best possible use for reheating the bath of liquid metal.

For this purpose, the subject of the invention is a process for smelting steel in an electric arc furnace of the type comprising a vessel containing a bath of molten steel, a roof resting on top of the said vessel and a single roof electrode or a plurality of roof electrodes lying within a cylinder, in which process an oxygenic gas in the form of gas jets is blasted into the said vessel towards the surface of the said bath, so that the areas of impact of the said jets on the said surface do not cover the said electrode or the said cylinder, characterized in that the said jets are blasted in from the upper part of the furnace and in that they have a =shallow depth of penetration into the said bath.

The subject of the invention is also a steel-making electric arc furnace, of the type comprising a vessel intended to contain the molten steel, a roof resting on top of the said vessel, a single roof electrode or a plurality of roof electrodes lying within a cylinder, and means for blasting jets of an oxygenic gas into the said vessel towards the surface of the said steel, the areas of impact of the said jets on the said surface not covering the said electrode or the said cylinder, characterized in that the said means are formed by tuyeres fitted in the said roof.

As will have been understood, the invention consists in carrying out postcombustion of the CO produced in the furnace by means of a multiplicity of oxygen jets directed onto the iron-containing materials which are being melted or have already melted, but making sure that these jets do not cause combustion of the graphite electrodes and do not penetrate too deeply into the bath of liquid metal, for reasons which will be explained later.

Figure 2:
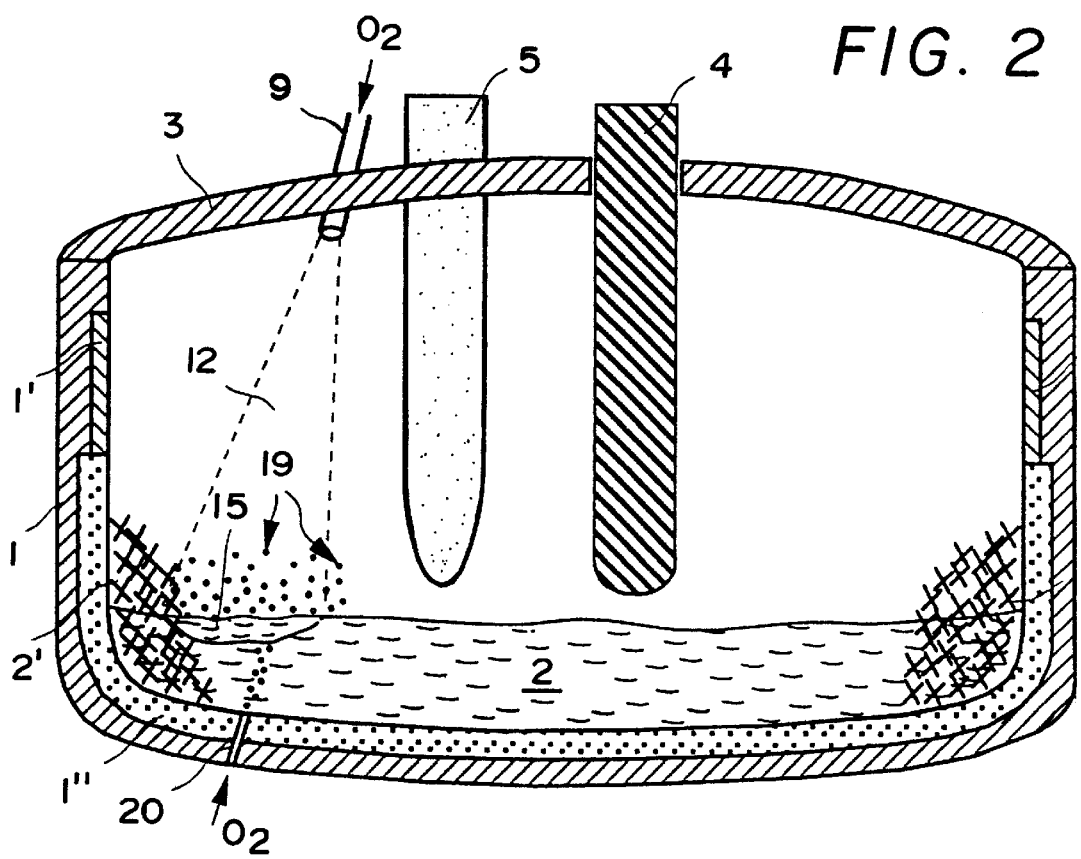

The invention will be more clearly understood on reading the description which follows, given with reference to the following appended figures:

FIG. 1, which diagrammatically represents, seen from above, the vessel of a steelmaking electric furnace allowing the invention to be implemented;

FIG. 2, which diagrammatically represents the same electric furnace seen from the side and in section through II—II.

The steelmaking electric arc furnace shown diagrammatically in FIGS. 1 and 2 conventionally comprises a vessel 1, the side wall of which is equipped with water-cooled panels 1' and the lower part of which is internally lined with refractories 1". It is this lower part which contains the steel being smelted, shown partly as forming a completely liquid bath 2 and for the remainder as forming scrap 2' which has not yet melted. In the example shown, three graphite electrodes 4, 5, 6, which are connected to an electrical power supply (not shown), pass through the roof 3 which rests on top of the vessel 1. The vessel 1 also comprises, conventionally, a deslagging door 7, via which the slag (not shown) lying on top of the liquid steel 2 may be removed periodically, and a pouring lip 8 (not shown in FIG. 2), via which the casting of the liquid steel 2 outside the furnace takes place.

In order to implement the process according to the invention, three oxygen-blasting tuyeres 9, 10, 11 are fitted in the roof 3. The oxygen jets 12, 13, 14 which emanate therefrom, the contours of which are drawn as dotted lines, are directed from the top downwards towards the surface of the bath of liquid steel 2. In order for this operation to have maximum effectiveness, the areas of impact 15, 16, 17 of the jets on the bath 2, the limits of which areas are shown diagrammatically by the dotted lines in FIG. 1, must cover as large a fraction of the surface of the bath 2 as possible. The aim is thus, in the immediate vicinity of the liquid metal 2, to oxidize most of the CO escaping therefrom to $CO_2$, and thus to optimize the transfer of thermal energy released by this oxidation to the liquid metal 2 or solid metal 2'. However, it is necessary for these areas of impact 15, 16, 17 not to cover the circle 18 within which the three electrodes 4, 5, 6 lie, so as not to cause excessive combustion of the electrodes 4, 5, 6. In the case of a single-electrode furnace, the areas of impact 15, 16, 17 must be taken away from the electrode itself, for the same reasons. Likewise, it is preferable that the oxygen jets 12, 13, 14 do not strike the refractory walls of the furnace 1, so as not to cause them to suffer excessive or unnecessary wear.

Another fundamental condition for obtaining satisfactory secondary combustion of CO is that the jets 12, 13, 14 must not strike the bath 2 too violently. If this were to happen, the oxygen would penetrate deeply into the liquid steel 2 and contribute to decarburizing it by forming CO, although this is not its function (for this purpose, oxygen is often injected directly into the bath 2 via submerged lances or tuyeres built into the hearth of the vessel 1). The postcombustion efficiency would thereby suffer. Moreover, penetration of the oxygen jets 12, 13, 14 into the bath 2 causes splashes of liquid steel droplets 19. These metal droplets may reduce $CO_2$ to CO. This reaction is endothermic and the inventors became aware that this effect contributed to cancelling out, partially and substantially, the postcombustion effect. These splashes are all the more intense the deeper the penetration of the oxygen jets into the liquid steel 2, and it is therefore very important that the oxygen jets blasted in via the roof tuyeres 9, 10, 11 be relatively "soft" jets. The inventors' experience shows that their depth of penetration into the bath of liquid metal 2 should optimally not exceed approximately 5 cm.

This depth may be estimated by means of mathematical models. By way of example, mention may be made of the method described in the article "A model study on jet penetration and sloping in the LD converter" (Tetsu To Hagane 58 (1972) No. 1, pp. 76–84), in which the depth of penetration into the liquid steel of an oxygen jet emanating from an emerged tuyere having a hole is expressed, in mm, by:

$$\text{Penetration} = A\, e^{-0.78\, H/A\, \cos \beta}$$

with:

$$A = 63\, (Q/d)^{2/3}$$

where:

Q is the oxygen flow rate in $Nm^3/h$;
d is the diameter of the hole in the tuyere, in mm;
H is the distance between the end of the tuyere and the surface of the bath of liquid steel 2, in mm;

β is the angle of inclination of the tuyere with respect to the horizontal.

The tuyeres 9, 10, 11 may also be used to heat the iron-containing materials before starting to melt them, in order to accelerate their melting. There must be a sufficient number of them to obtain as satisfactory a cover of the surface of the bath 2 as possible, according to the criteria which were explained above. However, it is preferable that the gas jets 12, 13, 14 be well separated from one another in order to obtain well-controlled aerodynamic conditions inside the furnace.

As mentioned, the practice of injecting oxygen into the bath of liquid steel 2 through the hearth of the vessel 1 via hearth tuyeres 20 is often employed in order to promote decarburization of the metal. Injection of non-oxidizing gas (nitrogen or argon) via these same hearth tuyeres 20 also has a beneficial effect on the decarburization kinetics and also on the rate of melting of the still solid iron-containing materials 2' by virtue of the agitation of the liquid metal 2 which it causes. It is advantageous that the areas of impact 15, 16, 17 of the oxygen jets 12, 13, 14 emanating from the roof tuyeres 9, 10, 11 lie over the sites where the hearth tuyeres 20 are fitted, since these areas form preferred sites for CO evolution. However, in this case it is even more crucial for there to be control of the depth of penetration of the oxygen jets 12, 13, 14 into the bath 2, since injection of gas via the hearth itself generates flashes of liquid metal droplets 19, and it is important that the oxygen coming from the roof does not excessively increase the intensity of these splashes, for reasons which were mentioned, which make it necessary to limit the reduction of $CO_2$ already formed.

Up to now it has been assumed that the tuyeres 9, 10, 11 were fitted in the roof 3 of the furnace. However, it is also conceivable for them to be fitted in the side wall of the vessel 1, insofar as the geometrical and aerodynamic conditions required by the process according to the invention are well combined. However, placing the tuyeres in the roof 3 has advantages which contribute to optimizing the implementation of the process according to the invention. In the first place, by comparison with tuyeres which are fitted in the side wall and which cover the same portions of the bath, roof tuyeres 9, 10, 11 deliver jets having a smaller inclination with respect to the vertical. This decreases the effect of causing the gases present in the furnace to circulate tangentially to the wall, which causes localized wear of the refractories. It is also easier to adjust the dimensions and orientations of the jets 12, 13, 14 so that they do not strike the wall of the furnace or the electrodes 4, 5, 6. Another advantage is that with a slightly inclined jet 12, 13, 14 emanating from a roof tuyere 9, 10, 11, the area of impact of the jet on the metal being melted varies little as the scrap is being melted and as its height in the furnace decreases. A highly inclined jet emanating from a wall tuyere would be much more sensitive to these height variations and there would no longer be the certainty that the end of the flame emanating from the tuyere is really in permanent contact with the metal. Now it is this end which is the hottest point of the jet and its contact with the metal 2 is an important condition for heat-transfer optimization. This optimization is therefore easier with roof tuyeres 9, 10, 11 than with wall tuyeres. Moreover, the intensity of the slag splashes decreases since a jet close to the vertical tends to push down the slag which it encounters rather than projecting it towards the walls of the furnace. Also for this reason, there is less wear of the refractories lining the furnace with roof tuyeres 9, 10, 11 than with wall tuyeres. Finally, and above all, for the same reasons associated with the smaller inclination of the oxygen jet with respect to the vertical, the splashes of metal emanating from the area of impact of the jet on the liquid metal 2 are themselves reduced by fitting the tuyeres in the roof 3 rather than in the side wall of the vessel 1 of the furnace. In addition, it may be seen that these splashes, which tend to reduce the $CO_2$ already formed, are highly prejudicial to the proper execution of the postcombustion of CO.

It is advantageous for most of the $CO_2$ to be in the upper layers of the atmosphere in the furnace, and advantageous for the oxygen present therein to be confined to areas as limited as possible both in terms of number and extent, this being so in order to prevent oxygen, which must be used for the postcombustion, from being sucked out of the furnace via the plant for capturing the combustion gases. Preferably, it is therefore necessary that the oxygen jets be not too numerous (three, for example) and that the tuyeres give them the shape of a cone with quite a large apex angle in order to maximize the bath surface covered by their areas of impact.

As a variant, instead of pure oxygen, it is possible to use highly heated air or, in general, an oxygenic gas, the essential being that it provides a high flame temperature (of the order of 2000° C.) during combustion of the CO.

With the process according to the invention it is therefore possible to exploit to the maximum the oxygen blasted into the furnace in order to ensure postcombustion of the CO formed. This may result, as required by the operator, compared to the prior practices, either in shortening the smelting time with constant electrical-energy, carbon and oxygen additions, since the intended temperatures for the liquid steel are achieved more rapidly, or in reducing the supply of electrical energy and the amount of oxygen and carbon introduced into the furnace, keeping the usual smelting time.

We claim:

1. A process for smelting steel in an electric arc furnace comprising a vessel containing a bath of molten steel having an upper surface, a roof resting on top of said vessel and a single roof electrode or a plurality of roof electrodes disposed within a circle, comprising the step of blasting an oxygenic gas in the form of gas jets into the vessel toward the upper surface of the bath such that said jets impact as large a fraction as possible of said surface except for said electrode and the circle, wherein said jets are blasted in from an upper part of the furnace and have a shallow depth of penetration into said bath of molten steel to avoid splashing of said steel and decarburization of said steel.

2. The process as claimed in claim 1, wherein said jets are blasted in from one or more tuyeres mounted in the roof of the furnace.

3. The process as claimed in claim 1, wherein the depth of penetration of the jets into the surface of the bath is less than approximately 5 cm.

4. The process as claimed in claim 1, wherein an inert or oxidizing gas is blasted in through the hearth of the furnace vertically below the areas of impact of the jets on the bath.

5. The process as claimed in claim 1, wherein an atmosphere mainly composed of $CO_2$ is maintained in the upper part of the furnace.

6. A steelmaking electric arc furnace comprising a vessel for containing liquid steel and iron-containing materials being melted, a roof resting on said vessel, a single roof electrode or a plurality of roof electrodes lying within a circle, and means including tuyeres fitted in the roof for blasting jets of an oxygenic gas into the said vessel toward an upper surface of a bath of liquid steel, wherein said tuyeres are arranged such that said jets impact as large a fraction as possible of said surface not covering said electrode or said circle.

7. The steelmaking electric arc furnace according to claim 6, which comprises means for blasting in an inert or oxidizing gas through the hearth of the furnace, the said means being placed vertically below the areas of impact of the said jets on the liquid steel.

8. A process for smelting steel in an electric arc furnace comprising a vessel containing a bath of molten steel having an upper surface, a roof resting on top of said vessel and a single roof electrode or a plurality of roof electrodes disposed within a circle, comprising the step of blasting an oxygenic gas in the form of gas jets into the vessel toward the upper surface of the bath such that said jets impact at least about one-third of said surface except for said electrode and said circle, wherein said jets are blasted in from an upper part of the furnace and have a depth of penetration of less than 5 centimeters into said bath of molten steel to minimize splashing and stirring of said molten steel.

9. The process defined in claim 8, wherein said jets impact about at least 40% of said upper surface of said bath.

* * * * *